UNITED STATES PATENT OFFICE.

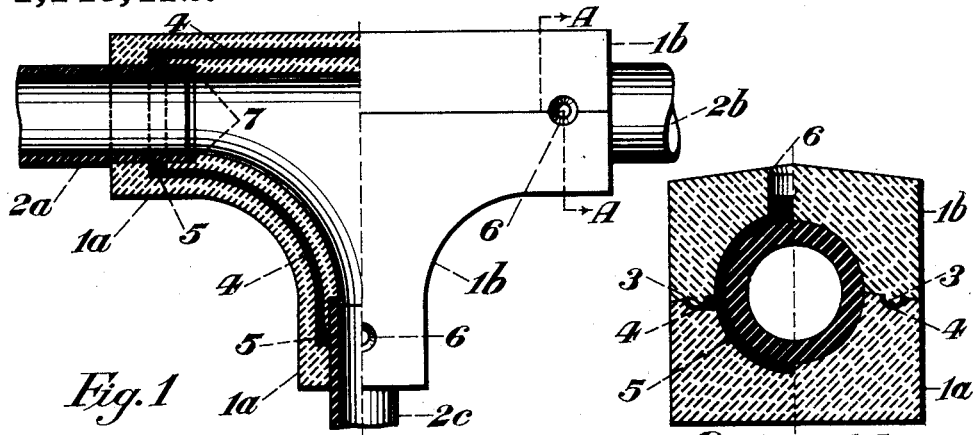
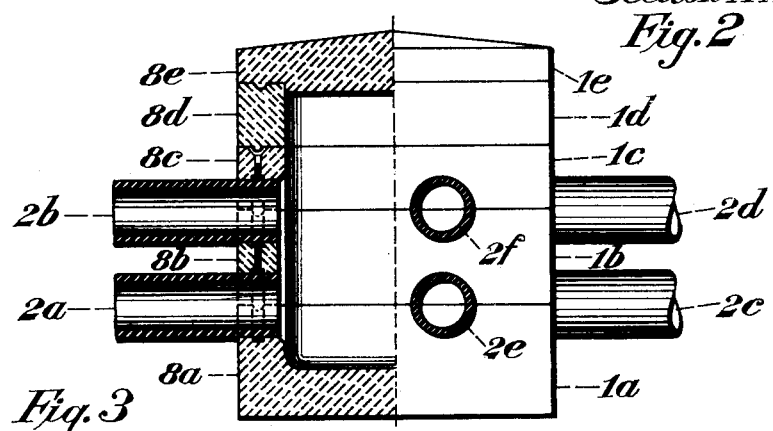
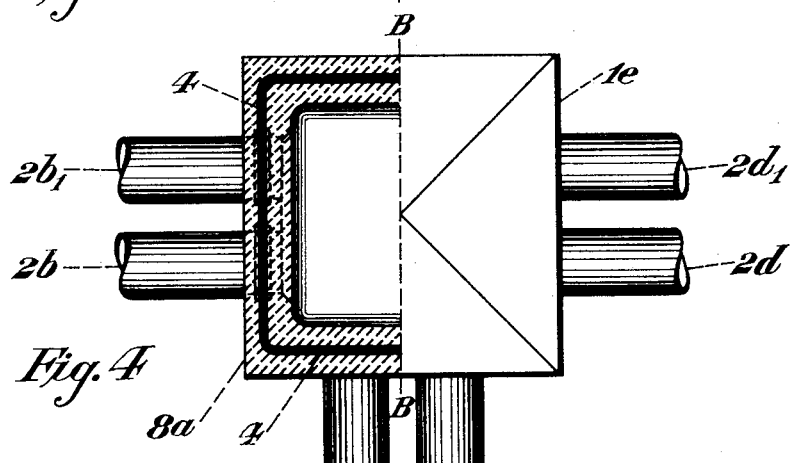

MATTHEW HARKNESS LOUGHRIDGE, OF NEW YORK, N. Y.

UNDERGROUND-CONDUIT CONSTRUCTION.

1,143,412.  Specification of Letters Patent.  Patented June 15, 1915.

Application filed June 5, 1912. Serial No. 701,831.

*To all whom it may concern:*

Be it known that I, MATTHEW HARKNESS LOUGHRIDGE, a citizen of the United States, and a resident of the city of New York, borough of Manhattan, in the county and State of New York, have invented a new and Improved Underground-Conduit Construction, of which the following is a full, clear, and exact description.

My invention is in relation to a construction in the combination of conduit with blocks of molded stone in which the said blocks form a support for the conduit, and a substitute for bends, and outlets which can be made at less cost than from the conduit material; also a construction in bends and outlets that may be built up in units to suit requirements and a means of holding these units in alinement and of sealing the joint where they are brought together.

Reference is to be had to the accompanying drawings forming a part of this specification, in which—

Figure 1 shows the application of my invention to a junction conduit at right angles to the main run of conduit, the conduit being of circular section and one-half of the cover being removed in the figure. Fig. 2 is a cross-section taken on line A—A Fig. 1 in which concrete blocks are used, and shows the particular construction for supporting the end of the conduit and of sealing the blocks where they come together. Figs. 3 and 4 show an outlet of concrete blocks adapted to four runs of conduit in three directions, Fig. 3 being an elevation in half cross-section on line B—B Fig. 4; the latter figure being a plan view with half the cover removed.

My invention comprises a construction of blocks of molded stone split on a line parallel with the longitudinal axis of the conduit. In Figs. 1 and 2 two such blocks are used, indicated by 1ᵃ and 1ᵇ. In Fig. 3 five such blocks are used indicated by 8ᵃ, 8ᵇ, 8ᶜ, 8ᵈ and 8ᵉ. The conduit is indicated by 2ᵃ, 2ᵇ, 2ᶜ, 2ᵈ, 2ᵉ and 2ᶠ. As shown in the figures, these blocks are split on the center line of each row of conduit and when assembled the weight of the upper block clamps the conduit firmly in place. They can therefore be placed in position or removed without disturbing electrical conductors in the conduit.

As shown in Fig. 1 the blocks are molded to a diameter that admits the end of the conduit with a snug fit for such a distance as will firmly support it. Where the conduit is such that the electrical conductors may be drawn into it a ledge is provided equal in thickness to the wall of the conduit as at 7 so that the interior presents a smooth surface with the interior of the conduit. In order that water may not enter between the conduit and the blocks where the former is supported, a space 5 having a larger diameter than the conduit is molded in the blocks. This space entirely envelops the conduit and is filled with sealing compound making a waterproof joint between the surface of the conduit and the blocks. In order to facilitate the filling of this compound in a liquid form into space 5, an opening 6 is provided in the block above through which it may be poured.

Where the two blocks are joined together provision is also made for a joint sealed with compound. This is shown in cross section at 4, Fig. 2 where the protecting rib 3 in the upper block fits into a similar sectional groove 4 in the lower block and the space between these is filled with compound as shown. This compound may be applied before the upper block is placed in position or may be poured after the block is assembled through opening 6 which communicates with the groove 4 and 5 as shown in Fig. 2. This seal can readily be broken and remade so that electrical conductors in the conduit are readily accessible.

The blocks are held in alinement by their shape fitting onto the conduit, also by the projecting rib 3 fitting into the groove 4 which may be made a snug fit on the edge for this purpose. The surface of the joint between the blocks is sloped downwardly toward the exterior so as to prevent water from entering the interior of the blocks.

Figs. 3 and 4 are built up of unit blocks and it is apparent that this construction may be designed to suit any size number and arrangements of conduit required.

Where it is desired to increase the depth of the outlet box filler blocks similar to 8ᵈ are used to build it up to the desired height, joints similar to those shown in Fig. 2 being used between each block.

From the above description it will be apparent that I have devised a new type of underground construction of superior practical advantage and simplicity, and I wish to have it understood that I do not care to be limited to the details shown and described except in so far as the same are made material by the terms of the claims appended hereto.

Having thus described my invention, I claim as new and desire to secure by Letters Patent:

1. A conduit construction having a plurality of waterproof conduits disposed in superposed groups; junction boxes comprising a plurality of continuous, superposed, separable ring members forming the side wall for each of said junction boxes, said ring members being provided with semi-circular, transverse edge recesses for receiving said conduits, and with semi-circular, annular, sealing grooves opening into said recesses, said grooves being in the plane of the wall in which they are formed, said members having open-ended passages connecting said grooves to form a feeding channel for sealing material, and said members having annular edge grooves communicating with said sealing grooves, for receiving the sealing material delivered thereto by said passages; and a flowing, sealing cement adapted to set, said cement filling said passages and grooves to seal the passage around said conduits and the sides of said recesses.

2. A conduit construction having a plurality of waterproof conduits and junction boxes therefor, said boxes comprising a plurality of superposed, separable ring members forming the side wall of said boxes, said ring members having formed in the meeting edges thereof registering, semi-circular, annular grooves and transverse registering, semi-circular recesses for receiving said conduits, and the superposed members being further provided with a pouring passage extending through the walls thereof to form an exposed, receiving opening; and a flowing, setting cement disposed in said grooves, recesses and pouring passage, for forming an unbroken, sealing member resting between said ring members and said conduits.

In testimony whereof I affix my signature in the presence of two witnesses.

MATTHEW HARKNESS LOUGHRIDGE.

Witnesses:
JAMES McGREGOR,
W. D. RIGNEY.

Copies of this patent may be obtained for five cents each, by addressing the "Commissioner of Patents, Washington, D. C."